United States Patent [19]

Nomura et al.

[11] Patent Number: 5,392,413
[45] Date of Patent: Feb. 21, 1995

[54] RECORD MEDIUM REPRODUCING DEVICE

[75] Inventors: Naomi Nomura; Tadashi Tanase; Shigehiko Takeshita, all of Chigasaki; Hiroyuki Hayashi, Yokohama; Kazuhiko Ono, Chigasaki, all of Japan

[73] Assignee: Hitachi, Ltd., Tokyo, Japan

[21] Appl. No.: 897,021

[22] Filed: Jun. 11, 1992

[30] Foreign Application Priority Data

Jun. 11, 1991 [JP] Japan ................................. 3-165201

[51] Int. Cl.⁶ .............................................. G06F 12/14
[52] U.S. Cl. ............................. 395/425; 364/DIG. 1; 364/246.8
[58] Field of Search ... 364/200 MS File, 900 MS File; 395/400, 425

[56] References Cited

U.S. PATENT DOCUMENTS 4,513,367  4/1985  Chan et al. ........................... 395/425
5,249,286  9/1993  Alpert et al. ......................... 395/425
5,253,351 10/1993  Yamamoto et al. ................... 395/425

Primary Examiner—Joseph L. Dixon
Assistant Examiner—Hiep T. Nguyen
Attorney, Agent, or Firm—Antonelli, Terry, Stout & Kraus

[57] ABSTRACT

In a CD-ROM disk reproducing device, for a data read instruction which specifies an address issued frequently from a host computer, irrespective of whether the device has a Lock Cache function, the time required from receipt of a data read instruction up to the actual data transfer is reduced. The data read instruction which specifies an address issued frequently from the host computer is discriminated by a microcomputer constituting a control section in the device and the read data from the address is locked in a storage section (buffer RAM) so as not to be erased. When a data read instruction specifying the same address is received afterward, data is read out directly from the storage section and transferred to the host computer.

20 Claims, 3 Drawing Sheets

RECORD MEDIUM REPRODUCING DEVICE

BACKGROUND OF THE INVENTION

The present invention relates to a record medium reproducing device wherein data from a data storage medium, such as an optical disk, is read and reproduced in response to a command (data read instruction) from a host computer and then delivered to the host computer.

A CD-ROM disk reproducing device is one example of such a storage medium reproducing device. In a CD-ROM disk reproducing device, the accessing of read data from a disk, serving as a data storage medium, and the delivering of the read data to a host computer is carried out as follows:

(a) First, a data read instruction is sent from the host computer to the CD-ROM disk reproducing device, specifying an address of a storage location for data to be read out from the disk.

(b) In the CD-ROM disk reproducing device, when the data read instruction is received, a pickup head for reading and reproducing the data from the disk is moved, as a part of a SEEK operation, to in address position specified by the data read information sent from the host computer.

(c) When data is read from the specified address position by the pickup head, the data is first written in a storage section (buffer RAM) temporarily.

(d) Next, the data from the specified address position written in the buffer RAM is read out and transferred to the host computer.

The accessing of read data obtained from the disk and the delivering of the read data to the host computer is carried out as described above. However, when the CD-ROM disk reproducing device receives a read instruction from the host computer, if data at the address position specified by the instruction has already been written in the buffer RAM and stored therein temporarily, the data need not be read again from the disk, and so moving the pickup head to the specified address position on the disk as part of a SEEK operation is unnecessary. Rather, the data which is already stored temporarily in the buffer RAM may be read out from the buffer RAM directly and transferred to the host computer, with the result that the period of time from the receipt of the data read instruction to the transfer of the requested data to the host computer can be reduced significantly.

The buffer RAM typically used in a CD-ROM disk reproducing device is a high speed, small capacity storage device, also referred to as a cache memory. Because such a memory device has a small capacity, once all storage locations are occupied, new data can not be stored without making room in the buffer RAM by erasing data in selected storage locations, and this is done by using a least-recently-used algorithm, for example. However, once data is erased from the buffer RAM, access to that data can be had only by a time consuming reference to the disk.

Therefore, as indicated in the SCSI-2 (Small Computer System Interface), revision 10C (communication standard regarding computers), among the read data already written in the buffer RAM, for data which is not to be erased by overwriting, but is to be retained for subsequent accesses, the address of the data on the disk specified from the host computer is locked in the buffer RAM by a command from the host computer, thereby providing a technique, known as a Lock Cache function, where data in the buffer RAM, is locked so that it can not be erased, such as by overwriting.

According to the Lock Cache function, data associated with an address position previously accessed from a host computer is always stored in a buffer RAM and may be locked by command from the host computer. If a specified address accompanying a data read instruction from the host computer is coincident with an address position previously accessed from the host computer, the pickup head need not be moved to the assigned address position on the disk, since the data at the accessed address position can be read out directly from the buffer RAM and be transferred immediately to the host computer, if the data is present in the buffer RAM, thereby reducing the time required for data transfer to the host computer following receipt of the data read instruction.

In a record medium reproducing device, such as a CD-ROM disk reproducing device, when such a Lock Cache function is not adopted, or when the Lock Cache function is adopted, but a request for data at an address other than an address previously accessed from the host computer occurs frequently, the SEEK operation involving moving of the pickup head to a specified address position on the disk is necessary. In such case, a problem occurs in that the period of time required from the receipt of the read instruction from the host computer to the time of actual data transfer to the host computer becomes long.

On the other hand, while use of the Lock Cache function serves to retain selected data in the buffer RAM for easy access, the need to control cache locking from the host computer represents an increased overhead which places an undesirable burden on the host computer.

SUMMARY OF THE INVENTION

In order to solve the above-mentioned problems, an object of the present invention is to provide a record medium reproducing device in which, when a read instruction for accessing data at specified storage location is issued frequently from a host computer, irrespective of whether the Lock Cache function is employed, the time required from the receipt of the read instruction from the host computer to the time of actual data transfer to the host computer can be reduced.

It is another object of the present invention to implement a Lock Cache function independent of control from the host computer so as to reduce the overhead on the host computer.

In order to attain the above object, in accordance with the present invention, in a storage medium reproducing device comprising a data storage medium, a signal reproducing section, a data temporary storage section and a control section, the control section discriminates an address which is received with a higher frequency among addresses on the data storage medium accompanying a data read instruction received from the host computer, and data at the address which is received with higher frequency locked in the data temporary storage section automatically without a command from the host computer. Then, when a data read instruction specifying that same address is subsequently received from the host computer, the data at the address is read out not from the data storage medium by the signal reproducing section, but the data is read out directly from the data temporary storage section and delivered to the host computer.

In accordance with the present invention, in the storage medium reproducing device, an address specified with a higher frequency from the host computer is discriminated by a microcomputer constituting the control section of the disk reproducing device, and data at that address is automatically locked in the buffer RAM, so that the data at that address can be transferred thereafter to the host computer in a short time following receipt of the read instruction specifying that address by transferring the data to the host computer directly from the buffer RAM. Thus, in contrast to the prior known disk reproducing device in which cache locking is controlled exclusively from the host computer, the present invention operates to implement cache locking from within the disk controller itself, thereby relieving the host computer of this task.

DESCRIPTION OF THE PREFERRED EMBODIMENTS

Figure 1:
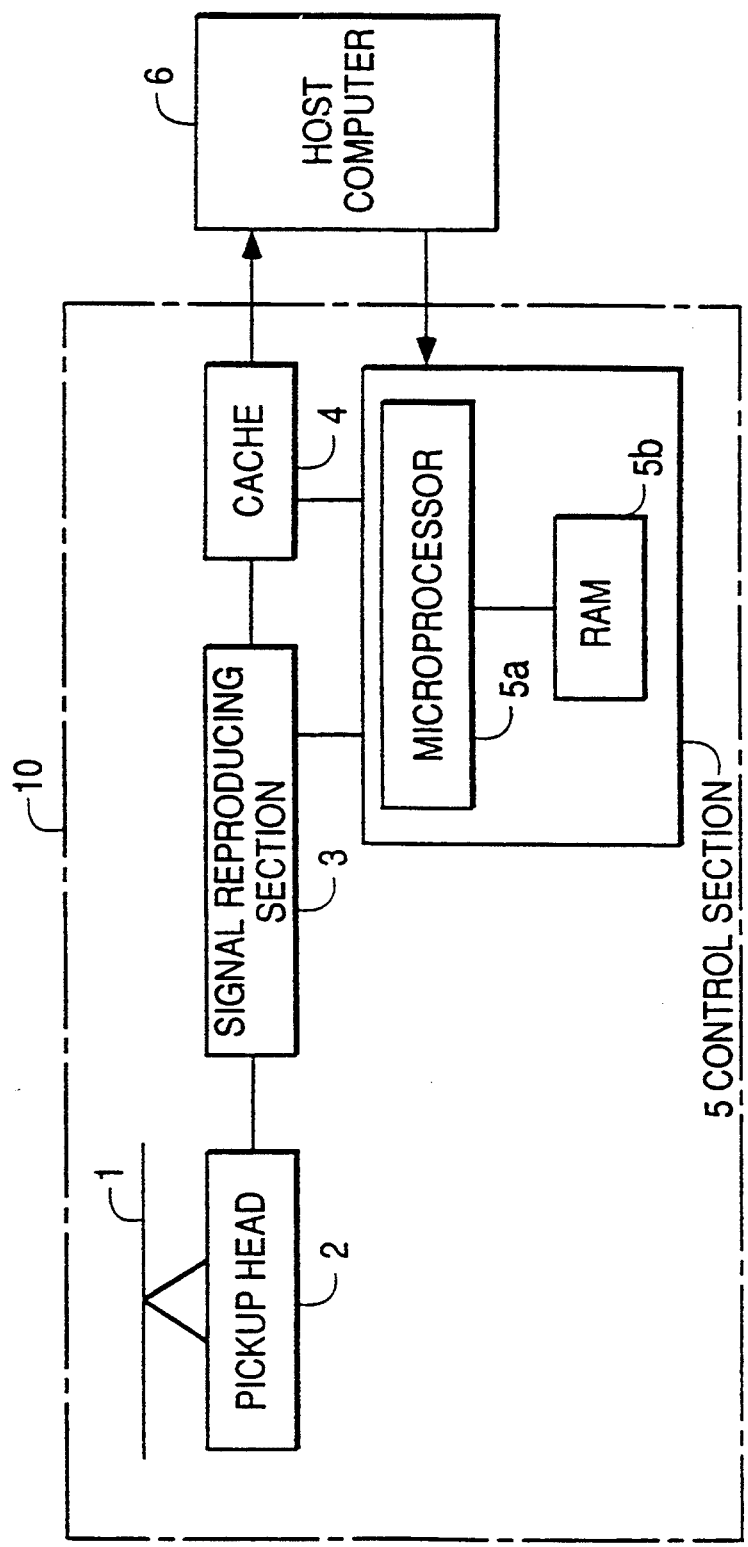
FIG. 1 is a block diagram showing an exemplary configuration of a CD-ROM disk reproducing device forming an embodiment of a record medium reproducing device according to the present invention.

In FIG. 1, a CD-ROM disk reproducing device 10 accesses data stored on a disk 1, used as a data recording medium, by way of a pickup head 2, under control of a signal reproducing section 3. There is also provided a temporary storage section (buffer RAM) 4 for storing data read from the disk 1, and a control section 5 constituted by a microcomputer including a microprocessor 5a and working memory (RAM) 5b, for example, which receives read instructions from a host computer 6 and controls the transfer of data into the buffer 4 from the disk 1 and from the buffer RAM 4 to the host computer 6.

The buffer RAM 4 includes a plurality of storage locations in which data may be stored in associated with an address of a storage location on the disk 1 where that same data is also stored so that the data stored in the buffer RAM 4 may be accessed its associated disk storage address in a conventional way. The detailed construction and operation of the buffer RAM 4 is not essential to the present invention, and so these details will not be described herein. However, each storage location may be selectively locked in some way, such as by control over a lock bit associated with or included in each such storage location, so that a storage location which is locked can not be erased or overwritten until it is unlocked. The specific manner in which cache locking is implemented within the buffer RAM 4 is not essential to the present invention, and any known way of implementing such locking and/or unlocking of individual storage locations in the buffer RAM 4 may be adopted according to this invention. However, the invention is directly concerned with the manner in which such locking is controlled from the control section 5, as will now be discussed.

The overall operation of the disk reproducing device of FIG. 1 will be described first. When a data read instruction is issued from the host computer 6 to the microprocessor 5a in the control section 5, the control section 5 investigates whether the requested data to be read in response to the read instruction is stored in the storage section (buffer RAM) 4 or not. If the requested data is not found in the buffer RAM 4, the pickup 2 is moved by the signal reproducing section 3 to an address position on the disk 1 specified by the read instruction. Thus, data at the specified address is read out from the disk 1 by the pickup 2, reproduced by the signal reproducing section 3 and written in the buffer RAM 4. In this case, the data is written in storage location in the storage section 4, along with the associated disk storage address, for example.

When a further data read instruction is issued from the host computer 6 to the microprocessor 5a in the control section 5, the control section 5 investigates whether the requested data to be read in response to the read instruction is stored in buffer RAM 4. If it is not stored in the buffer RAM 4, the operation is carried out as above described. If it is written in the buffer RAM 4, the control section 5 reads out the requested data from the buffer RAM 4 and immediately transfers the read data to the host computer 6.

Further, in accordance with the present invention, if the control section 5 determines that an address specified by a data read instruction issued from the host computer 6 to the control section 5 is an address which is specified frequently, the requested data read out in response to the specified address from the disk 1 is written in the buffer RAM 4, and then the data storage location in the buffer RAM 4 is locked so as not to be erased, such as by overwriting, afterward.

Figure 2:
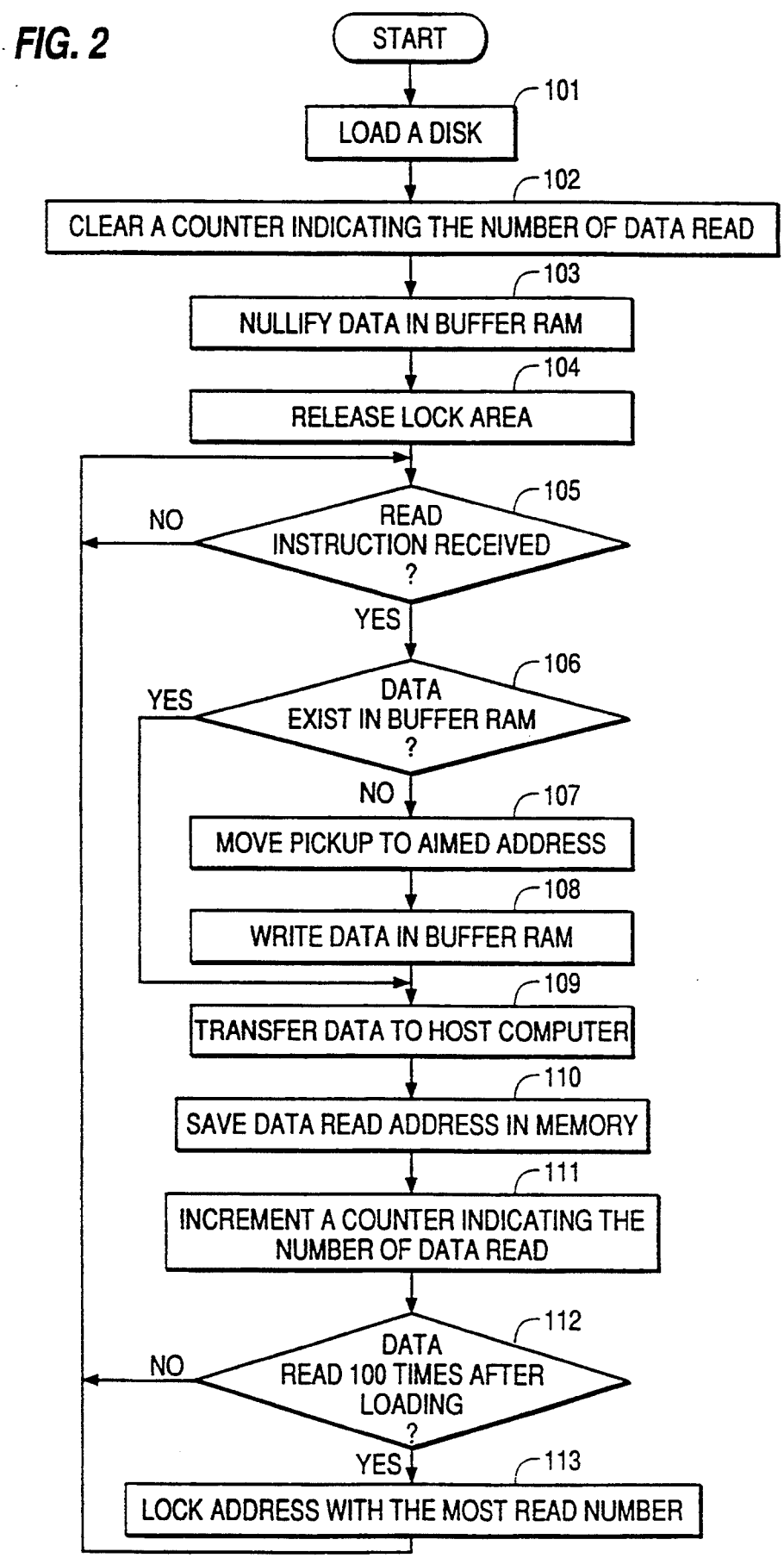
FIG. 2 is a flow chart illustrating the operations executed by a control section (microcomputer) in FIG. 1.

FIG. 2 is a flow chart of the operations executed under program control by the microprocessor 5a in the control section 5 in FIG. 1. The flow chart is composed of steps 101–113.

After the start, which may be initiated when a new disk 1 is loaded in the CD-ROM storage device 10 (step 101), a counter, which may be implemented under software control by the microprocessor 5a in the control section 5, indicating the number of data read until then (regarding the previous disk), is cleared and initialized (step 102). Also, data stored in buffer RAM 4 until then is nullified (step 103), and all storage locations in the storage buffer RAM 4 are unlocked, i.e. the cache is flushed (step 104).

In this state, if a data read instruction issued from the host computer 6 is received by the control section 5 (step 105), the operation moves to step 106 and the control section 5 investigates whether the data requested by the data read instruction is stored in the buffer RAM 4. If not, the process advances to step 107 and the pickup head 2 is moved to an address position on the disk 1 designated by the data read instruction and the requested data is read out. Then, the process advances to step 108 and the requested data is written into a storage location in the buffer RAM 4.

Subsequently, in step 109, the requested data is read out from the buffer RAM 4 and transferred to the host computer 6. When the data has been transferred, the address of the storage location on the disk 1 from which the data has been transferred (the address specified by the data read instruction) is also stored (saved) in working memory 5b in the control section 5 (step 110). The counter (contained in the control section 5) indicating the number of data read from the disk 1 is then incremented (step 111).

Next, in step 112, it is determined by the microprocessor 5a whether data has been read 100 times, i.e. whether 100 read instructions have been received from the host computer 6. If not, the operation returns to step 105, and step 105 to 111 are repeated for each read instruction received from the host computer 6. However, in step 112, if the counter confirms that data has been read 100 times after loading of the disk 1, the microprocessor 5a discriminates an address stored in working memory 5b having the highest read frequency among data read 100 times, and data associated with that address in the buffer RAM 4 is locked under control of the microprocessor 5a. That is, the storage location where that data is written data is locked that the data may so not be erased, such as by overwriting, afterward.

As a result, when a read instruction requesting the same data is received next in step 105, the process advances to step 106 and an investigation is made as to whether the data requested by the data read instruction is stored in the buffer RAM 4. If it is found (cache hit), the process jumps to step 109 and the requested data can be immediately transferred to the host computer 6. Further, when the buffer RAM 4 is full and new data is to be stored therein, the storage location which is locked will not be selected for storing the new data, thereby insuring that frequently accessed data is always retained in the buffer RAM 4.

It will be noted from the foregoing description of one embodiment of this invention that the control over locking of storage locations in the buffer RAM 4 is effected entirely by the control section 5 and without need for a command from the host computer 6 to carry out selection of the storage locations to be locked or identification of the data to preserved in the buffer RAM 4. By providing a cache locking function independent of the host computer 6, the overhead of the host computer 6 is significantly relieved and a more responsive and flexible control over cache locking can be accomplished within the disk controller itself.

Figure 3:
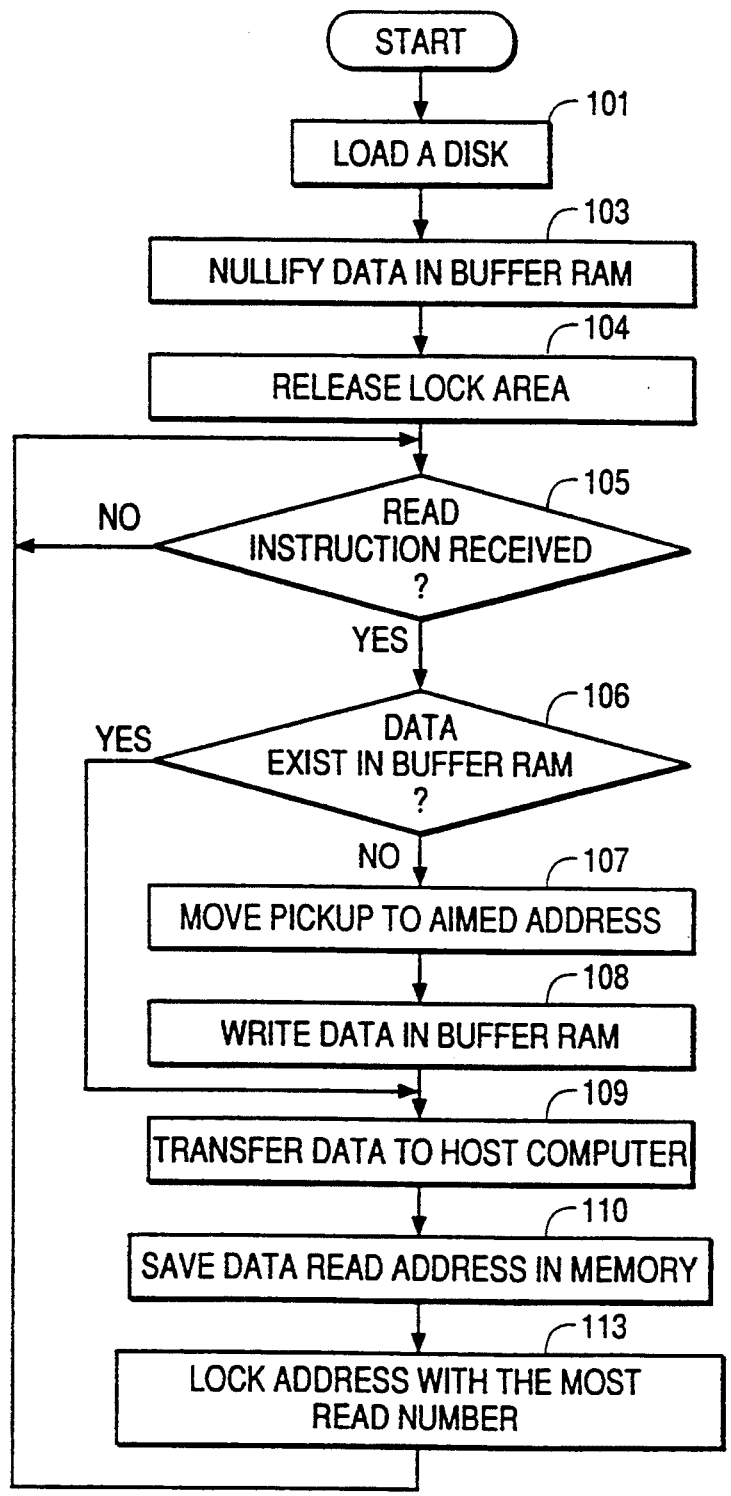
FIG. 3 is another flow chart illustrating other operations executed by the control section (microcomputer) in FIG. 1.

The operations indicated in the flow chart of FIG. 2 provide one example of the effects of the present invention, but the modifications also may be made to this process, as shown in FIG. 3.

In FIG. 3, it is noted that steps 110 and 111 of FIG. 2 are omitted. Thus, in this embodiment, there is no need for a counting operation during the initial loading of the buffer RAM 4 to determine when discrimination of a high frequency address may be initiated. That is, the number of data read during initial loading is not limited to any definite number, such as 100, but discrimination occurs every time data is read to determine which address is specified most frequently among data read up to that point in time and the storage location in the buffer RAM 4 associated with the discriminated address is locked at that time. This operation is basically the same operation as occurs in step 113 of FIG. 2 after step 112 in the first embodiment detects that data has been read 100 times.

In the embodiment of FIG. 3, during initial loading of the buffer RAM 4, it is apparent that, until an address is specified more than once, each storage location in the buffer RAM 4 will be locked. However, once an address is specified a second time, previously locked storage locations will be unlocked and the one storage location associated with the address specified with highest frequency is locked. Further, if more than one storage location is associated with an address specified with the same highest frequency, all such storage locations may be locked.

In step 113 of the embodiments of both FIG. 2 and FIG. 3, the operation of discriminating an address specified with high frequency need not be limited to a single address of highest frequency request, but may be plural addresses which exceed a predetermined frequency of request. In this regard, the frequency at which each address is specified in received read instructions is compared to the predetermined frequency, and any storage location which is associated with an address which is specified at a frequency equal to or higher than the predetermined frequency is locked.

In discriminating addresses specified in high frequency in step 113, it is possible to store an address every time it is specified by a read instruction in the working memory 5b in step 110 even if the same address or addresses are stored several times, and then periodically count the number of times each address appears in the memory 5b using the microprocessor 5a. On the other hand, it is also possible to store each address specified by a read instruction only once in the working memory 5b along with a count value which is then incremented each time the same address is specified by a received read instruction.

In actual practice, a data read instruction may specify a range of addresses rather than a single address of a single storage location from which data is to be read. In such case, the memory 5b in the control section will store ranges of addresses specified by data read instructions, and a range or ranges of storage locations associated with a range or ranges of addresses of high frequency request will be locked in buffer RAM 4.

According to the present invention, as above described in detail, in a storage medium reproducing device, an address data having a higher reading frequency accessed from the host computer is discriminated by the microcomputer constituting the control section, and data at that address is automatically locked in the buffer RAM, so that the data is always available to be transferred to the host computer in a short time following receipt of a read instruction for the address having the higher reading frequency.

Also, the description of the embodiments has exemplified a CD-ROM disk reproducing device, but the present invention can be applied not only to a CD-ROM disk reproducing device, but also to storage medium reproducing devices in general, such as an optical disk storage reproducing device, a tape storage reproducing device for a DAT streamer or the like, and similar effects, of course, can be obtained in connection with such devices.

While the present invention has been described in terms of its preferred embodiments, it should be understood that numerous modifications may be made thereto without departing from the spirit and scope of the invention as defined in the appended claims. It is intended that all such modifications fall within the scope of the appended claims.

What is claimed is:

1. A recording medium reproducing device for controlling access to data stored on a data storage recording medium in response to a data read instruction from a host computer, comprising:

a signal reproducing section;

a data temporary storage section for temporarily storing data received from said data storage medium for transfer to said host computer; and a control section, responsive to a data read instruction from the host computer specifying an address of a storage location on said data storage recording medium, for controlling said signal reproducing section to read data at the specified address from said data storage recording medium, for storing the read data temporarily in said data temporary storage section, and for delivering the data from said data temporary storage section to said host computer;

wherein said control section includes means for discriminating at least one address received with higher frequency of access among addresses of storage locations on said data storage recording medium, specified by data read instructions received from said host computer, and for locking data having such address received with higher frequency of access in said data temporary storage section to prevent erasing locked data when new data replaces previously stored data in said temporary storage section, so that when a data read instruction accompanied by an address having a higher frequency of access is received from said host computer, data at that higher frequency of access address is always available to be read out directly from said data temporary storage section and delivered to said host computer.

2. A recording medium reproducing device according to claim 1, wherein said discriminating and locking means includes means for counting a number of times each address is stored in said data temporary storage section.

3. A recording medium reproducing device according to claim 2, wherein said discriminating and locking means further includes memory means for storing each address received from said host computer, said counting means operating to periodically count a number of times each address appears in said memory means.

4. A recording medium reproducing device according to claim 3, wherein said discriminating and locking means periodically selects an address which appears in said memory means with highest frequency of access as indicated by said counting means and locks the data in said data temporary section associated with the selected address.

5. A recording medium reproducing device according to claim 3, wherein said discriminating and locking means periodically selects each address which appears in said memory means more than a predetermined number of times, as indicated by said counting means, and locks the data in said data temporary storage section associated with the selected address.

6. A recording medium reproducing device according to claim 3, wherein said counting means operates every time an address is stored in said data temporary storage section.

7. A recording medium reproducing device according to claim 2, wherein said discriminating and locking means includes memory means for storing addresses, which are also stored in said data temporary storage section, and a count value for each address indicating a number of times said address is specified by a data read instruction, said counting means comprising means for incrementing a count value for an address in said memory means when the address is specified by a data read instruction.

8. A recording medium reproducing device according to claim 7, wherein said discriminating and locking means periodically selects an address in said memory means which has the highest count value and locks the data in said data temporary storage section associated with the selected address.

9. A recording medium reproducing device according to claim 7, wherein said discriminating and locking means periodically selects each address in said memory means which has a count value greater than a predetermined number and locks the data in said data temporary storage section associated with the selected addresses.

10. A recording medium reproducing device according to claim 1, wherein said discriminating and locking means includes a memory for storing each address of a data read instruction received from said host computer and means for discriminating an address having a higher frequency of access by counting the number of appearances of each address in said memory.

11. A recording medium reproducing device according to claim 1, wherein said control section further includes a counter for counting the number of data read instructions issued from said host computer, said discriminating and locking means operating to discriminate at least one address and lock the data in said data temporary storage section only after said counter has reached a predetermined count.

12. A recording medium reproducing device according to claim 11, wherein said predetermined count is 100.

13. A recording medium reproducing device according to claim 1, wherein said discriminating and locking means operates to lock data in said data temporary storage section by setting a lock bit associated with the storage location in said data temporary storage section in which the data is stored.

14. A recording medium reproducing device according to claim 1, wherein said data storage recording medium is a compact disk.

15. A recording medium reproducing device for controlling access to data stored on a data storage recording medium in response to a data read instruction from a host computer, comprising:

a signal reproducing section;

a data temporary storage section for temporarily storing data received from said data storage recording medium for transfer to said host computer; and a control section, responsive to a data read instruction from the host computer specifying an address of a storage location on said data storage recording medium, for controlling said signal reproducing section to read data at the specified address from said data storage recording medium, for storing the read data temporarily in said data temporary storage section, and for delivering the data from said data temporary storage section to said host computer;

wherein said control section includes discriminating means responsive to the frequency at which individual addresses are specified by data read instructions received from said host computer for selecting data to be locked in said data temporary storage section independent of said host computer.

16. A recording medium reproducing device according to claim 15, wherein said discriminating means includes means for determining an address which is specified by data read instructions at a high frequency of access.

17. A recording medium reproducing device according to claim 16, wherein said determining means identifies an address which is specified by data read instructions with highest frequency of access.

18. A recording medium reproducing device according to claim 16, wherein said determining means identifies each address which is specified by data read instructions with a frequency of access higher than a predetermined frequency of access.

19. A recording medium reproducing device according to claim 16, wherein said discriminating means includes a memory for storing addresses which are also stored in said data temporary storage section and means for determining the frequency at which addresses are specified by data read instructions on the basis of information stored in said memory.

20. A recording medium reproducing device according to claim 15, wherein said data storage recording medium is a compact disk.

* * * * *